US012474468B2

(12) United States Patent
Smith et al.

(10) Patent No.: US 12,474,468 B2
(45) Date of Patent: Nov. 18, 2025

(54) DEEP LEARNING-BASED MULTIBAND SIGNAL FUSION FOR 3-D SAR SUPER-RESOLUTION

(71) Applicant: Board of Regents, The University of Texas System, Austin, TX (US)

(72) Inventors: Josiah W. Smith, Frisco, TX (US); Murat Torlak, Plano, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 160 days.

(21) Appl. No.: 18/483,904

(22) Filed: Oct. 10, 2023

(65) Prior Publication Data

US 2024/0134037 A1   Apr. 25, 2024

Related U.S. Application Data

(60) Provisional application No. 63/378,950, filed on Oct. 10, 2022.

(51) Int. Cl.
| | | |
|---|---|---|
| *G01S 13/90* | (2006.01) | |
| *G01S 7/03* | (2006.01) | |
| *G06T 3/4046* | (2024.01) | |
| *G06T 3/4061* | (2024.01) | |
| *G06T 17/00* | (2006.01) | |

(52) U.S. Cl.
CPC .......... *G01S 13/9021* (2019.05); *G01S 7/03* (2013.01); *G06T 3/4046* (2013.01); *G06T 3/4061* (2013.01); *G06T 17/00* (2013.01)

(58) Field of Classification Search
None
See application file for complete search history.

(56) References Cited

U.S. PATENT DOCUMENTS

2021/0319289 A1* 10/2021 Han ............... G06F 17/141
2025/0060475 A1*  2/2025 Zhang ............. G01S 13/885

OTHER PUBLICATIONS

Fan, Lei; Fast Detection and Reconstruction of Tank Barrels Based on Component Prior and Deep Neural Network in the Terahertz Regime; Jun. 2022; IEEE Transactions on Geoscience and Remote Sensing; vol. 60; p. 1-3, 9; https://ieeexplore.ieee.org/stamp/stamp.jsp?tp=&arnumber=9809965 (Year: 2022).*
Li, Yuan; Moving-Target Velocity Estimation in a Complex-Valued SAR Imagery; Jan. 2013; Progress in Electromagnetics Research; vol. 136, p. 301-323; https://www.jpier.org/issues/reader.html?pid=12112005 (Year: 2013).*

(Continued)

*Primary Examiner* — Joni Hsu
(74) *Attorney, Agent, or Firm* — Yee & Associates, P.C.

(57) ABSTRACT

Multiband radar fusion is provided. The method comprises collecting first radar data from a first radar having a first frequency and collecting second radar data from a second radar having a second frequency different from the first frequency. A hybrid, dual-domain complex value convolutional neural network (CV-CNN), fuses the first and second radar data. The CV-CNN alternates between operating in the wavenumber-domain and the spatial-domain of the first and second radar data. A synthetic aperture radar image is reconstructed from the fused first and second radar data according to Fourier-based algorithm.

18 Claims, 15 Drawing Sheets

(56) References Cited

OTHER PUBLICATIONS

Bai, Xueru; Robust Pol-ISAR Target Recognition Based on ST-MC-DCNN; Dec. 2019; IEEE Transactions on Geoscience and Remote Sensing; vol. 57; p. 9912-9926; https://ieeexplore.ieee.org/stamp/stamp.jsp?tp=&arnumber=8804365 (Year: 2019).*

Yanik, Muhammet; 3-D MIMO-SAR Imaging Using Multi-Chip Cascaded Millimeter-Wave Sensors; Nov. 2019; 2019 IEEE Global Conference on Signal and Information Processing (GlobalSIP); p. 1-4; https://ieeexplore.ieee.org/stamp/stamp.jsp?tp=&arnumber=8969133 (Year: 2019).*

* cited by examiner

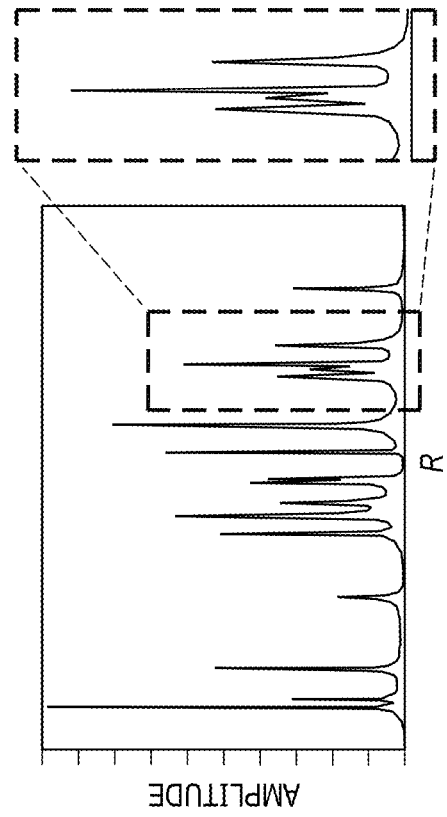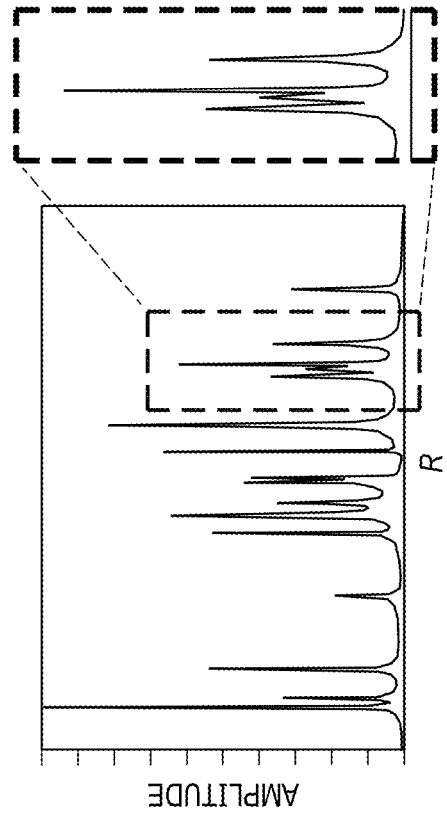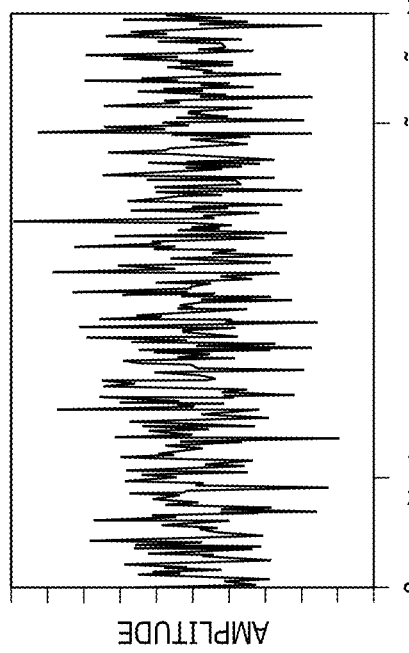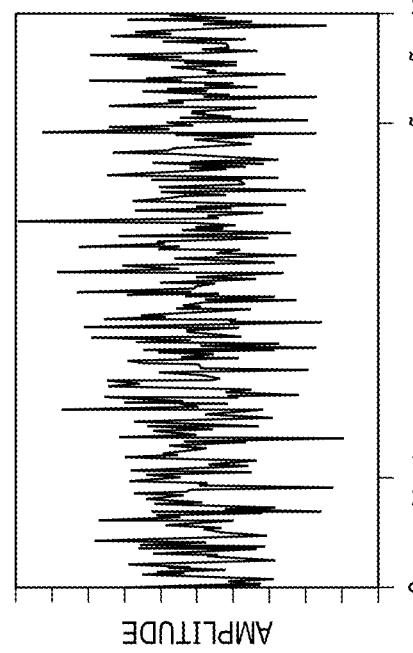

DEEP LEARNING-BASED MULTIBAND SIGNAL FUSION FOR 3-D SAR SUPER-RESOLUTION

CROSS-REFERENCE TO RELATED APPLICATION

This application is a utility conversion and claims priority to U.S. Ser. No. 63/378,950, filed Jun. 10, 2022, the contents of which are incorporated herein by reference in their entirety for all purposes.

BACKGROUND INFORMATION

1. Field

The present disclosure relates generally to radar imaging, and more specifically to the use of deep learning to achieve high resolution synthetic aperture radar imaging.

2. Background

Near-field synthetic aperture radar (SAR) imaging has received increasing attention for use in nondestructive testing, concealed weapon detection, medical imaging, and remote sensing. Owing to the non-ionizing nature of electromagnetic (EM) waves at millimeter-wave (mmWave) and terahertz (THz) frequencies, they are considered safe for human applications. Consequently, mmWave devices have been used for many sensing and imaging problems. Image resolution is a key characteristic of near-field SAR imaging.

In particular, because the downrange resolution is inversely proportional to the system bandwidth, ultrawideband transceivers are continually challenged to achieve greater bandwidths, as Gigahertz-scale bandwidths are required to achieve cm (centimeter) and sub-cm resolutions. Although sophisticated lab equipment can fulfill the bandwidth demands of certain applications, end-user applications are constrained by cost, size, measurement speed, etc., thereby deeming such laboratory implementations infeasible for real-world applications.

To overcome these shortcomings, one solution is to operate several radars at distinct subbands across a large bandwidth and fuse the radar data to improve the sensing resolution. However, practical multiband systems using commercially available mmWave radars face several implementation challenges and lack research for near-field SAR imaging.

Therefore, it would be desirable to have a method and apparatus that take into account at least some of the issues discussed above, as well as other possible issues.

SUMMARY

An illustrative embodiment provides a computer-implemented method of multiband radar fusion. The method comprises collecting first radar data from a first radar having a first frequency and collecting second radar data from a second radar having a second frequency different from the first frequency. A hybrid, dual-domain complex value convolutional neural network (CV-CNN), fuses the first and second radar data. The CV-CNN alternates between operating in the wavenumber-domain and the spatial-domain of the first and second radar data. A synthetic aperture radar image is reconstructed from the fused first and second radar data according to Fourier-based algorithm.

Another illustrative embodiment provides a hybrid, dual-domain complex value convolutional neural network (CV-CNN) for fusing radar data. The hybrid, dual-domain CV-CNN comprises a first complex-valued convolution layer. Four residual blocks following the first complex-valued convolution layer, and domain transformation blocks are interleaved between the four residual blocks. A pass-through connection in the wavenumber-domain runs from the first complex-valued convolution layer to after the fourth residual blocks. A fifth residual block follows the pass-through connection, followed by a second complex-valued convolution layer.

Another illustrative embodiment provides a multiband imaging system. Multiband imaging system comprises a two-axis mechanical scanner, a first radar having a first frequency mounted to the two-axis mechanical scanner, and a second radar having a second frequency different from the first frequency mounted to the two-axis mechanical scanner. A computer system is connected to the first radar, second radar, and two-axis controller. The computer system is configured to: collect first radar data from the first radar; collect second radar data from a second radar; fuse, by a hybrid, dual-domain complex value convolutional neural network (CV-CNN), the first and second radar data, wherein the CV-CNN alternates between operating in the wavenumber-domain and the spatial-domain of the first and second radar data; and reconstruct a synthetic aperture radar image from the fused first and second radar data according to Fourier-based algorithm.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8C illustrates multiband signal fusion performance using kR-net;

FIG. 8D illustrates an ideal fullband scenarios for a single simulated signal comprising randomly place point scatters;

DETAILED DESCRIPTION

Figure 1:
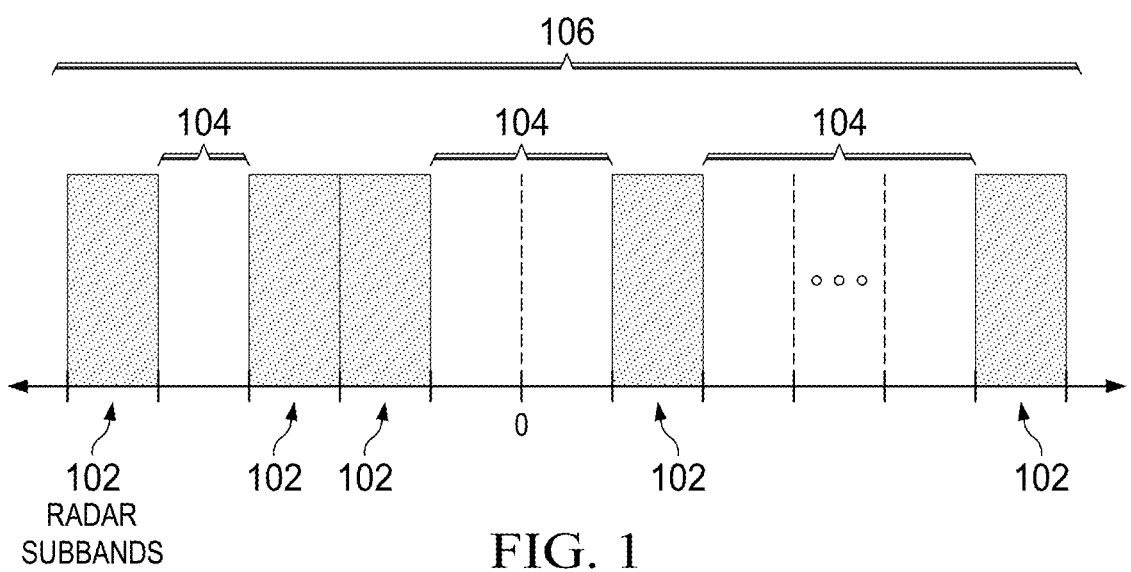
FIG. 1 depicts a diagram representing multiband radar signaling comprising samples separated by frequency gaps to which the illustrative embodiments may be applied.

The different illustrative embodiments recognize and take into account that algorithms for radar imaging via multiband signal fusion have been investigated on numerous fronts over the last several decades. Autoregressive (AR) models have been employed for signal fusion using a root MUltiple Signal Classification (MUSIC) or matrix-pencil approach to estimate the signal poles. Recent approaches computed the signal poles of the AR model using Bayesian learning algorithms and support vector regression. Additionally, an all-phase fast Fourier transform (FFT) and iterative adaptive approach has been proposed for signal-level fusion of de-chirped linear frequency modulated (LFM) signals. Data-level fusion algorithms that require prefocusing prior to fusion have been explored for signal fusion in the frequency-wavenumber domain. A matrix Fourier transform (MFT) method has been detailed for simple signal fusion in the k-domain. However, undesirable sidelobes in the range-domain or Rdomain were observed. To address this limitation, a k-domain fusion algorithm has been proposed using an iterative matrix-pencil algorithm (MPA) for improved microwave imaging. However, the MPA assumes a simplistic target model, and performance is degraded for complicated or intricate targets common in applications such as automatic target recognition (ATR) and concealed item detection.

The illustrative embodiment also recognize and take into account that data-driven algorithms that have dominated computer vision, specifically convolutional neural network (CNN) architectures, are gaining increasing interest for their applications in mmWave and THz imaging. Several approaches employ CNN architectures in the image domain to achieve near-field SAR super-resolution for various tasks. CNN architectures have also been used in conjunction with compressed sensing (CS) techniques for near-field mmWave imaging under sparse sampling. At the signal-level, data-driven algorithms have been employed for line-spectra super-resolution and have been applied to far-field radar imaging. Such techniques are advantageous over traditional line-spectra super-resolution techniques, such as MUSIC, because they are highly parallelizable. Although multiband signal fusion is a problem similar to line-spectra super-resolution, deep learning-based fusion techniques have not been explored.

The illustrative embodiments provide a multiband signal fusion algorithm, kR-Net, using a hybrid, dual-domain complex value CNN (CV-CNN) approach for improved 3-D SAR imaging. Under the Born approximation of the scattered field, we model the wavenumber-domain signals as a sum of damped/undamped complex exponential functions sampled at each subband. Hence, the spectral representation of the multiband signal comprises the sum of the subband spectra.

Recovering the missing data in the frequency gap between the subbands is a dual problem to wavenumber spectral enhancement. Applying a traditional convolutional architecture to the multiband signal in the wavenumber-domain faces the challenge of the slow growth of the effective receptive field relative to the number of samples between the subbands. As a result, many layers of the network lack the global context necessary to recover the equivalent wide bandwidth. However, forsaking processing in the wavenumber-domain ignores key relationships between the known subbands and predicted samples in the frequency gap.

To overcome these limitations, we introduce a novel CV-CNN architecture operating in both the wavenumber- and wavenumber spatial-domain, which outperforms equivalent approaches that act exclusively in one domain. Recently, the Fourier transform has been employed in deep learning to improve the efficiency of transformer architectures and to implement convolution in the Fourier domain, achieving global receptive fields. A hybrid frequency/image domain network was previously developed for magnetic resonance (MR) image reconstruction using the 2-D Fast Fourier Transform (FFT) to alternate between the image and frequency domains of the MR image.

Similarly, kR-Net applies a hybrid technique that interleaves forward and inverse FFTs between the convolutional layers in the CNN architecture. This interleaving allows the model to learn features in both the k-domain (wavenumber-domain) and the R-domain (spectral domain). The illustrative embodiments are the first to leverage the relationships in both domains of multi-sinusoidal signals for deep learning-based signal processing. Using this hybrid technique, the proposed CV-CNN architecture fuses multiband data in the wavenumber-domain to form an equivalent wide bandwidth signal. The model architecture also features a simplified residual block and improved complex-valued parametric activation function. After the data from each subband are fused, the 3-D SAR image can be recovered using an efficient Fourier-based algorithm.

The illustrative embodiments provide several technical solutions. The illustrative embodiments provide a novel dual-domain CV-CNN architecture for multiband super-resolution in the R-domain with improved convergence and performance compared to a network operating exclusively in either domain. Unlike previous multiband fusion techniques, kR-Net does not assume a small number of reflectors and boasts superior robustness for super-resolution of intricate, high-bandwidth targets. An illustrative embodiment provides a multiband imaging system using two commercially available radars each with a bandwidth of 4 GHz operating at 60 GHz and 77 GHz and real-time multi-radar synchronization. Extensive experimental results, including simulation studies and validation using the proposed dual-radar prototype, verify that the proposed algorithm is capable of high-fidelity multiband signal fusion, outperforming existing techniques while achieving high efficiency.

FIG. 1 depicts a diagram representing multiband radar signaling comprising samples separated by frequency gaps to which the illustrative embodiments may be applied. The goal of multiband signal fusion is to recover the equivalent wideband signal spanning the entirety of the subbands.

Under the multiband scenario, samples are taken across multiple subbands 102 separated by frequency gaps 104, where the radar subbands 102 represent the operating frequency ranges of the radars. The illustrative embodiments assume a weak or constant relationship between the scattering properties and frequency across the entire bandwidth 106 spanned by the subbands 102. To achieve the desired resolution, multiband signal fusion methods are applied to recover the unoccupied frequency bins (gaps 104) and obtain the equivalent wideband signal spanning the entirety of the subbands.

Suppose two radars operate at starting frequencies $f_1$ and $f_2$, respectively, and illuminate a target in x-y-z Cartesian space, where z represents the downrange or range direction, and x-y are known as the cross-range directions. Consider a single monostatic radar element operating at both subbands and located at (x', y', z') illuminating $N_t$ targets modeled as point scatterers, where the i-th target is located at $(x_i, y_i, z_i)$ with reflectivity $\alpha_i$. The wavenumber-domain, or k-domain, response to a chirp signal at the first and second radars can be written as $$s_1(n) = \sum_{i=0}^{N_t-1} \alpha_i e^{-j2(k_1+\Delta_k n)R_i}, n = 0, \ldots, N_k - 1, \quad (1)$$

$$s_2(m) = \sum_{i=0}^{N_t-1} \alpha_i e^{-j2(k_2+\Delta_k m)R_i}, m = 0, \ldots, N_k - 1, \quad (2)$$

where $k_1$ and $k_2$ are the wavenumbers corresponding to the starting frequencies $f_1$ and $f_2$, respectively, $k=2\pi f/c$, $\Delta_k$ is the wavenumber sampling interval, n is the time sample index, $N_k$ is the number of samples in each subband, and $R_i$ is the distance from the radar to the i-th scatterer, which is expressed as $$R_i = [(x'-x_i)^2 + (y'-y_i)^2 + (z'-z_i)^2]^{1/2}. \quad (3)$$

Both $s_1(\cdot)$ and $s_2(\cdot)$ are considered multi-sinusoidal signals because they are composed of a superposition of scaled complex exponential functions, whose frequencies are determined by the ranges $R_i$. Hence, the wavenumber spectral domain, known as the range-domain or R-domain has peaks at positions corresponding to the ranges $R_i$. Defining $\Delta_B \triangleq k_2 - k_1$, the difference between the starting wavenumbers, the signal at the second subband can be rewritten with respect to $k_1$ and different indexing as $$s_2(n') = \sum_{i=0}^{N_t-1} \alpha_i e^{-j2(k_1+\Delta_k n')R_i}, n' = \tilde{N}, \ldots, N, \quad (4)$$

such that $\tilde{N} \triangleq \Delta_B/\Delta_k$ is the offset between subbands 1 and 2, where $N \triangleq \tilde{N} + N_k - 1$, $n' = n + \tilde{N}$, and $\tilde{N} > N_k$. We assume that $\tilde{N}$ is an integer based on the proper choice of $\Delta_k$ and $\Delta_B$, although the derivation is valid regardless.

Figure 2A:
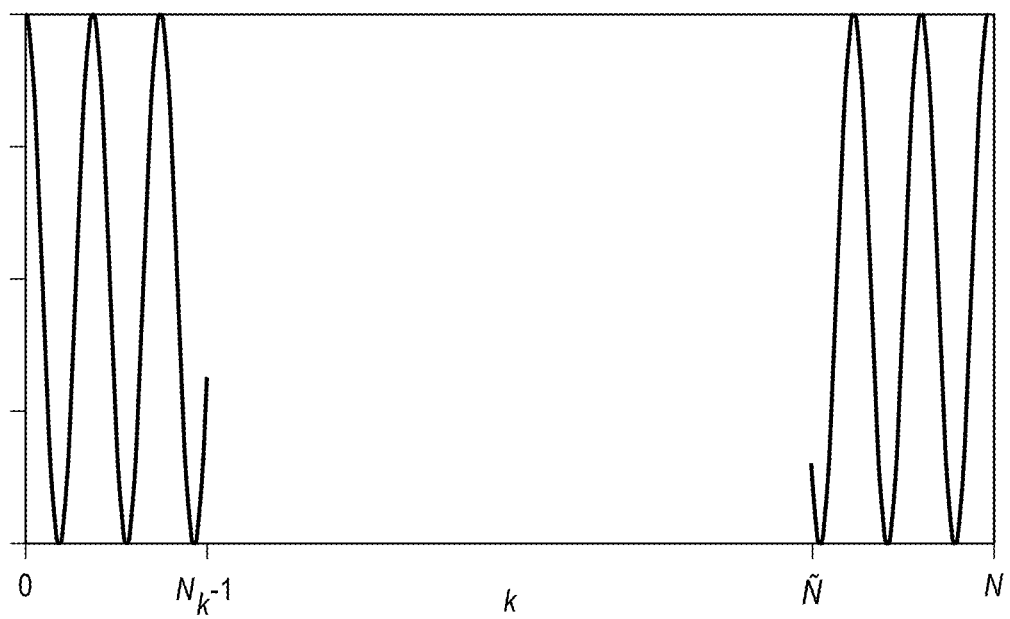
FIG. 2A depicts a k-domain (wavenumber-domain) non-contiguous dual-band signal.
Figure 2B:
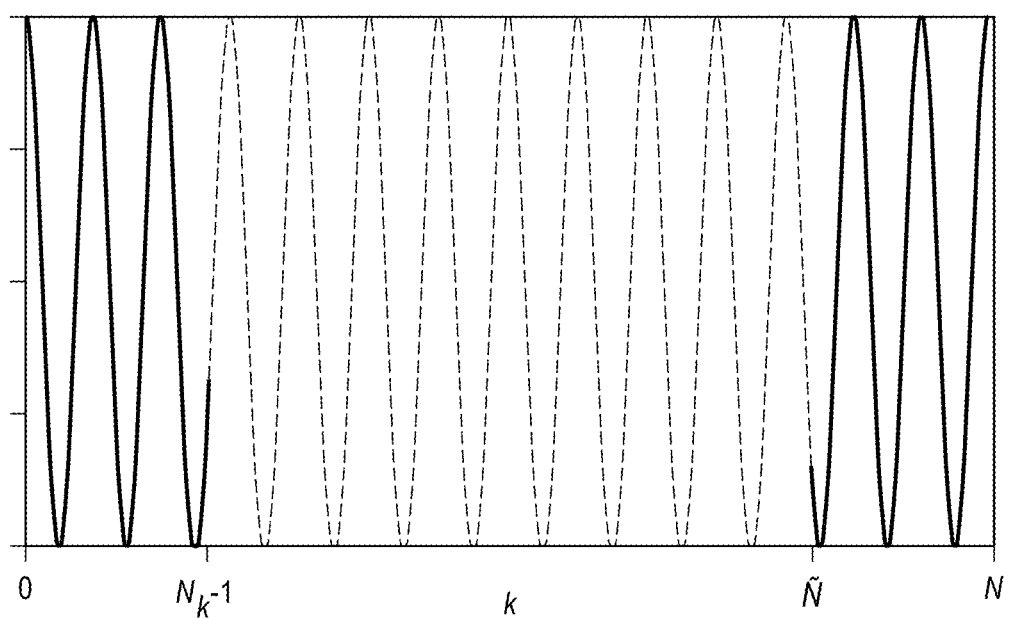
FIG. 2B depicts a k-domain ideal full-band signal.
Figure 2C:
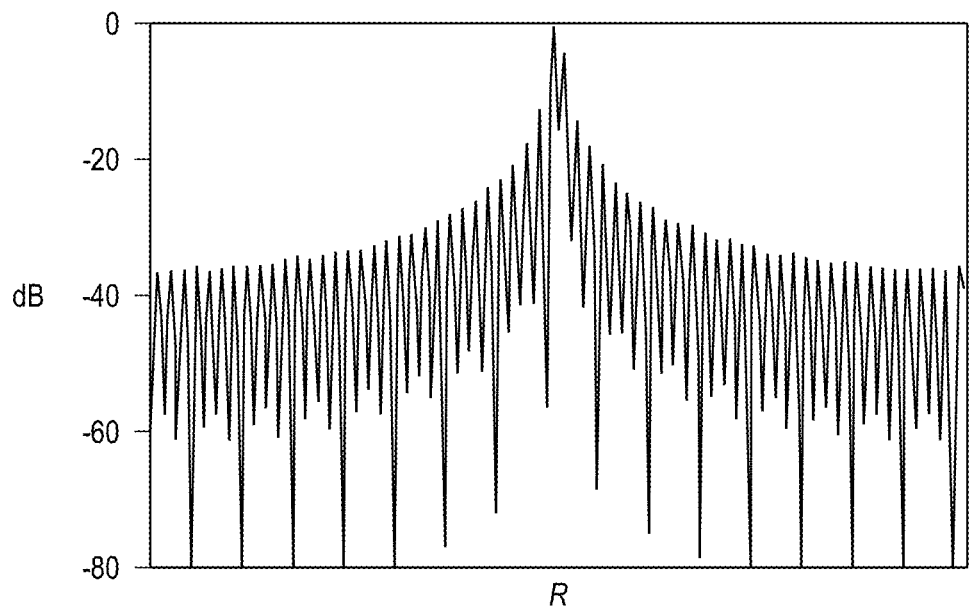
FIG. 2C depicts the R-domain (spatial-domain) spectrum of the non-contiguous dual band signal in FIG. 2A with zero-padding.
Figure 2D:
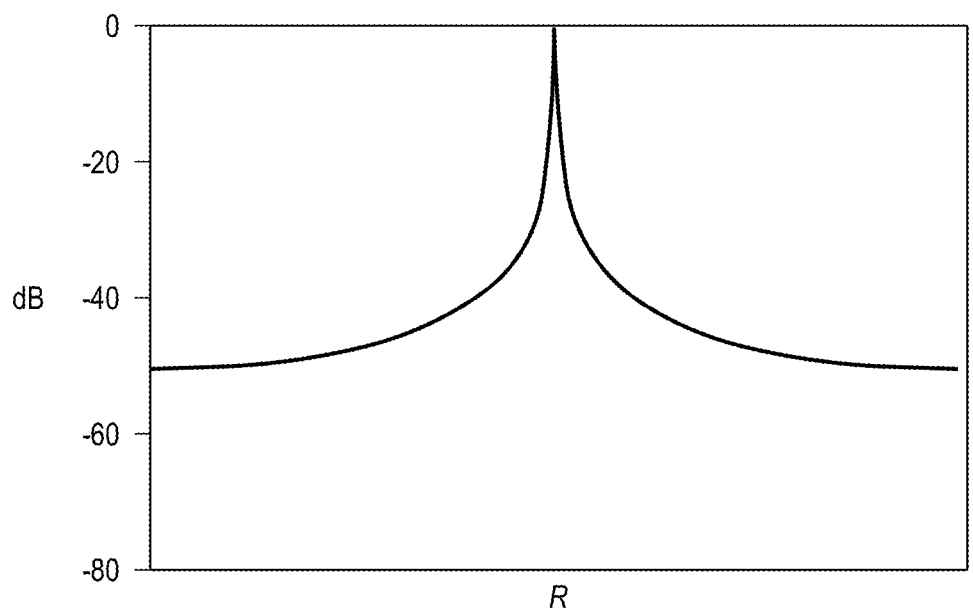
FIG. 2D depicts the R-domain spectrum of the ideal full-band signal in FIG. 2B.

FIGS. 2A-2D depict a multiband scenario with two subbands in the k-domain and R-domain. FIG. 2A depicts a k-domain non-contiguous dual-band signal. FIG. 2B depicts a k-domain ideal full-band signal. FIG. 2C depicts the R-domain spectrum of the non-contiguous dual band signal in FIG. 2A with zero-padding. FIG. 2D depicts the R-domain spectrum of the ideal full-band signal in FIG. 2B.

From equations (1) and (4), the multiband scenario can be understood as a multi-sinusoidal signal sampled across several disjoint regions offset by $\tilde{N}$. We refer to the two subbands scenario as non-contiguous dual-band, as shown in FIG. 2A. Although the two subbands may not be coherent the subbands are treated as coherent in our analysis. The signal in the k-domain can be represented in the R-domain, or wavenumber spatial-domain, by taking the Fourier transform. Limiting the sampling in each subband to $N_k$ corresponds to a convolution in the R-domain with a discrete sinc or Dirichlet kernel of width $1/N_k$, resulting in smearing of the spectral information and causing closely spaced peaks to bend together. Given the structure of the multiband signal, the R-domain spectrum is the sum of the spectra for each subband if the frequency gap is ignored. Because of the sinc-effect and phase shift in the R-domain corresponding to the $\tilde{N}$ sample shift in the k-domain for each of the $N_t$ reflectors, the non-contiguous dual-band signal in the R-domain suffers from artifacts/sidelobes as the frequency gap between the subbands is neglected, as shown in FIG. 2C. This analysis is identical to the MFT, which results in images degraded by increased sidelobes in the range direction. Comparatively, the R-domain spectrum of the ideal full-band signal (FIG. 2B) does not contain spurious peaks that would distort the images recovered from the fused signal, thereby achieving improved resolution compared with each subband and the MFT approach.

The objective of multiband signal fusion is to interpolate the bandwidth between the subbands in the k-domain to acquire the ideal full-band signal shown in FIG. 2B, where the dotted portion represents the signal in the frequency gap. Methods for recovering the missing wavenumber-domain data from $N_k$ to $\tilde{N}-1$ apply MUSIC or the MPA to estimate the signal poles in an all-pole model. However, these approaches assume that the target has a low bandwidth; that is, the estimated model order of $s1(\cdot)$ and $s2(\cdot)$, $\hat{N}_t \approx N_t$, is small compared with $N_k$. $\hat{N}$ is typically chosen such that $\hat{N}_t < \text{round}(N_k/3)$ for the MPA. However, high-resolution near-field SAR often requires imaging of intricate, high-bandwidth objects that are modeled by thousands or millions of point scatterers, or $N_t \gg N_k$. As a result, traditional approaches such as the MPA, which assume the sample covariance matrix is low-rank, neglect high-frequency features of the target degrade imaging performance.

Multiband signal fusion can be posed as a spectral super-resolution/restoration problem in the R-domain, the dual to interpolation in the k-domain. As shown in FIGS. 2C and 2D, R-domain super-resolution of the $N_t$ peaks corresponds to extrapolation of the full bandwidth. Deep learning-based solutions have proven successful in similar spectral-enhancement problems on radar images and multi-sinusoidal line-spectra, achieving resolution exceeding the theoretical limitations. However, data-driven approaches have not been applied to multiband signals to achieve joint k-domain extrapolation and R-domain super-resolution. Because the multiband fusion problem has distinct features in the k-domain and R-domain, we propose a hybrid approach that operates in both domains.

Figure 3:
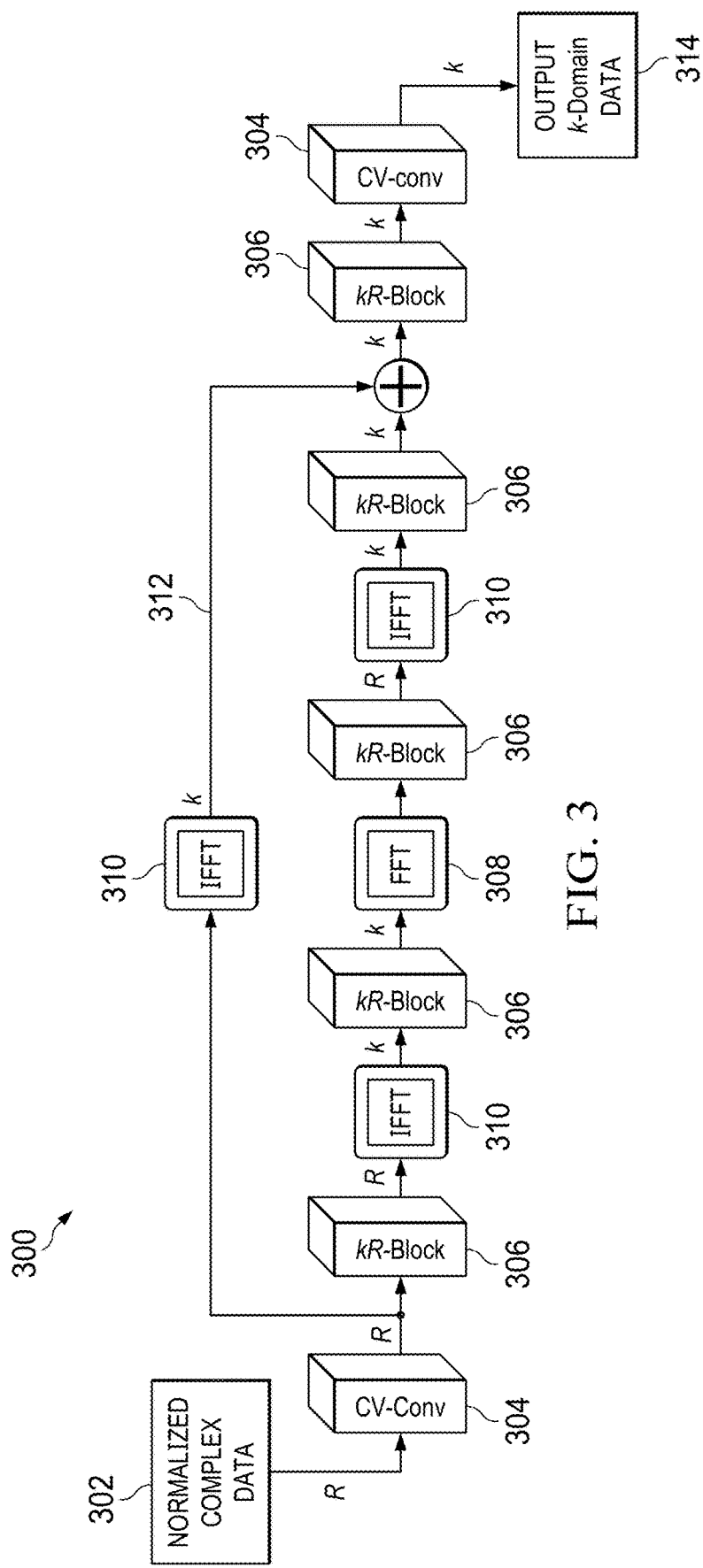
FIG. 3 depicts an architecture of a hybrid, dual-domain complex value convolutional neural network (CV-CNN) in accordance with an illustrative embodiment.

FIG. 3 depicts an architecture of a hybrid, dual-domain complex value convolutional neural network (CV-CNN) in accordance with an illustrative embodiment. The novel dual-domain CV-CNN, referred to as kR-Net 300, performs efficient multiband fusion for improved 3-D near-field SAR imaging.

The architecture of kR-net 300 alternates between operating in the k-domain and R-domain, allowing the network to learn characteristics specific to each domain. Compared with learning in only one domain, kR-Net 400 demonstrates superior convergence and quantitative performance. Additionally, the algorithm is robust for low and high-bandwidth imaging scenarios, which are common in many realistic applications.

In FIG. 3 the signal domain is denoted at each connection as k or R for the wavenumber-domain or wavenumber spatial-domain, respectively. The forward and inverse Fast Fourier Transform are denoted by FFT and IFFT, respectively. The input is given as the R-domain spectrum of the wavenumber-domain samples and is processed in both domains by residual kR-blocks. After the residual connection, an additional kR-block and complex-valued convolution (CV-Conv) layer process the signal before it is output in the k-domain.

The input signals 302 to kR-net 300 are complex-valued signals of length N. The input signals 302 are normalized by the min-max norm before being passed to the first CV-Conv layer 304. Since the network expects an input in the R-domain, the FFT of the k-domain data is computed prior to the input to the network with zero-padding between the sub-bands. Complex-valued convolution extends the convolution operation employed by CNNs to complex input data.

To implement a CV-Conv layer 304, the convolution kernel matrix is also complex-valued. However, because the convolution between two complex-valued tensors is generally unsupported by deep learning software, we decompose the input signal $x = x_R + jx_I$ into real and imaginary parts. Similarly, expressing the kernel as $M = M_R + jM_I$, the complex-valued convolution can be written, neglecting the bias terms, as $$x \circledast M = x_R \circledast M_R - x_I \circledast M_I + j(x_R \circledast M_I + x_I \circledast M_R), \quad (5)$$

where $\circledast$ denotes the real-valued convolution operation. By decomposing the convolution in this manner, complex-valued convolution can be computed using existing techniques operating on the real and imaginary parts of the input signal and kernel.

The CV-Conv layer is generally defined with a kernel size K, zero-padding such that the signal length of N is preserved at the output, $C_{in}$ input channels, and $C_{out}$ output channels. In the present example, the first layer of kR-Net 300 is a CV-Conv layer 304 with one input channel and F output channels, where F is the number of feature channels throughout the network.

Figure 4:
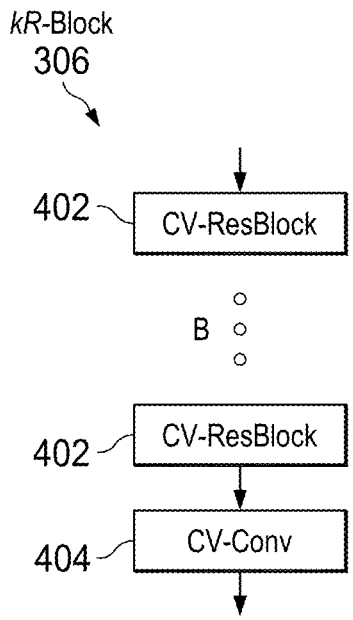
FIG. 4 depicts the architecture of a kR-block in accordance with an illustrative embodiment.

After the input signals 302 are processed by the first CV-Conv layer 304, a residual pass-through is connected after the alternating domain processing of the kR-blocks 306 after an IFFT 310 is applied. FIG. 4 depicts the architecture of a kR-block 306. Each kR-Block 306 comprises a cascade of complex-valued residual blocks (CV-ResBlock) 402 followed by a single CV-Conv layer 404. Each kR-Block 306 operates on the signal in either the k-domain or R-domain as the signal alternates between the two domains throughout the kR-Net.

Referring back to FIG. 3, Because the FFT 308 IFFT 310 domain transformation blocks are fully differentiable, they can be treated as conventional layers in the network, and gradient backpropagation can easily be implemented. The Fourier operations are performed across each activation map and normalized to make the FFT 308 and IFFT 310 orthonormal. Based on the convolution properties of the Fourier transform, convolution in one domain can be viewed as multiplication in the other domain. In this sense, applying a CV-Conv layer in the k-domain can be considered as a fully connected layer in the R-domain. However, our hybrid, dual-domain approach outperforms a network operating exclusively in the k-domain or R-domain in terms of convergence and numerical performance. Hence, compared with conventional CNN models, the addition of the FFT 308 and IFFT 310 domain transformation blocks throughout the network is key to improving multiband fusion performance.

Figure 5:
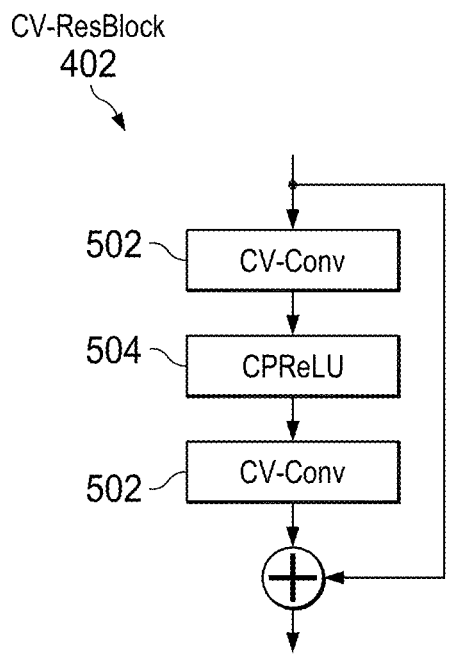
FIG. 5 depicts the architecture of a complex-valued residual block in accordance with an illustrative embodiment.

The architecture of the CV-ResBlock 402 is shown in FIG. 5. The CV-ResBlock 402 comprises two complex-valued convolution layers 502 separated by an activation function 504, the complex parametric rectified linear unit (ReLU). The Complex Parametric ReLU (CPReLU) activation function may be selected over alternatives, such as the complex ReLU (CReLU) (which computes the sum of the ReLU operation on the real and imaginary values separately) because the CPReLU has an improved activation over the complex domain. Using the notation employed in equation (5), the CPReLU can be expressed as $$\text{CPReLU}(x) = \max(0, x_R) + \eta_R \min(0, x_R) + \max(0, x_I) + \eta_I \min(0, x_I), \quad (6)$$

where the parameters $\eta_R$ and $\eta_I$ are learned during the training stage of the network for each CPReLU instance. Because $\eta_R$ and $\eta_I$ are learned independently, different layers of the network may learn different representations of the signal in amplitude and phase, aiding in network robustness.

Referring back to FIG. 3, after the first four kR-Blocks 306, the residual connection 312 is made in the k-domain followed by another kR-Block 306 and a CV-Conv layer 304 before being output 314.

Multiple values for the convolution kernel size K are investigated, and in one embodiment the optimal value is determined empirically to be K=5. The number of feature maps throughout the network is chosen as F=32, and the number of CV-ResBlocks for each kR-block is set as B=8. In the example embodiment, kR-Net comprises 87 CV-Conv layers and has 876628 learnable parameters. Multiband signal fusion is performed by kR-Net 300 on a signal of length N, yielding a fused signal in the k-domain of equivalent size.

The weights of the network are calibrated using an Adam optimizer with a learning rate of $1 \times 10^{-4}$, $\beta 1 = 0.9$, and $\beta 2 = 0.999$. Training can be performed on a single RTX3090 GPU with 24 GB of memory with a batch size of 1024 and L1 loss criterion.

Since there is no publicly available dataset for near-field multiband SAR imaging, we generate training and testing datasets by simulating the response to a multiband LFM radar. The ideal noiseless full-band signals spanning both subbands and the frequency gap in the k-domain are generated as $$s(\ell) = \sum_{i=0}^{N_t - 1} \alpha_i e^{-j 2 (k_1 + \Delta_k \ell) R_i}, \quad \ell = 0, \ldots, N-1, \quad (7)$$

where $\alpha_i$ values are selected from a complex normal distribution and $R_i$ values are chosen from a uniform distribution spanning the unambiguous range of the radar. After computing the full-band signals, $s(\cdot)$, the multiband signals, $\hat{s}(\cdot)$, are obtained by nullifying the samples in the frequency gap as $$\hat{s}(\ell) = \begin{cases} s(\ell) & \ell \in [0, N_k - 1] \cup [\tilde{N}, N-1] \\ 0 & \ell \in [N_k, \tilde{N} - 1] \end{cases}. \quad (8)$$

The multiband signals are then corrupted with complex additive Gaussian white noise (AWGN) in each subband. The noisy multiband signals are used as the input to kR-Net after taking the FFT and employing the normalization process detailed above. Each noisy multiband signal is treated as a feature vector with a corresponding label vector consisting of the ideal full-band signal in equation (7).

To train the network, 1048576 samples are independently generated with $N_t$ target reflectors, where $N_t$ is randomly selected between 1 and 200. Signal-to-noise ratio (SNR) for each sample is selected on a continuous uniform distribution from −10 to 30 dB. A validation set of 2048 samples is generated using the same procedure. Assuming a realistic scenario with two radars with starting frequencies $f_1$=60 GHz and $f_2$=77 GHz, where each radar has a bandwidth of B=4 GHz, we take $N_k$=64 and $\Delta_f$=62.5 MHz. Hence, $\tilde{N}$=272, N=336, and the low-rank assumption of the MPA, $\hat{N}_t$<round ($N_k$/3), will often be invalid if the target is high-bandwidth and consists of many reflectors. Although the present example employs 60 GHz and 77 GHz radars, the algorithms of the illustrative embodiments can easily be extended to other multiband configurations. For practical implementations, federal communications commission (FCC) licensing may not allow this combination of subbands, but the algorithm and concepts derived remain valid. By training on this dataset, the proposed algorithm learns to perform multiband fusion for high-bandwidth targets.

Figure 6:
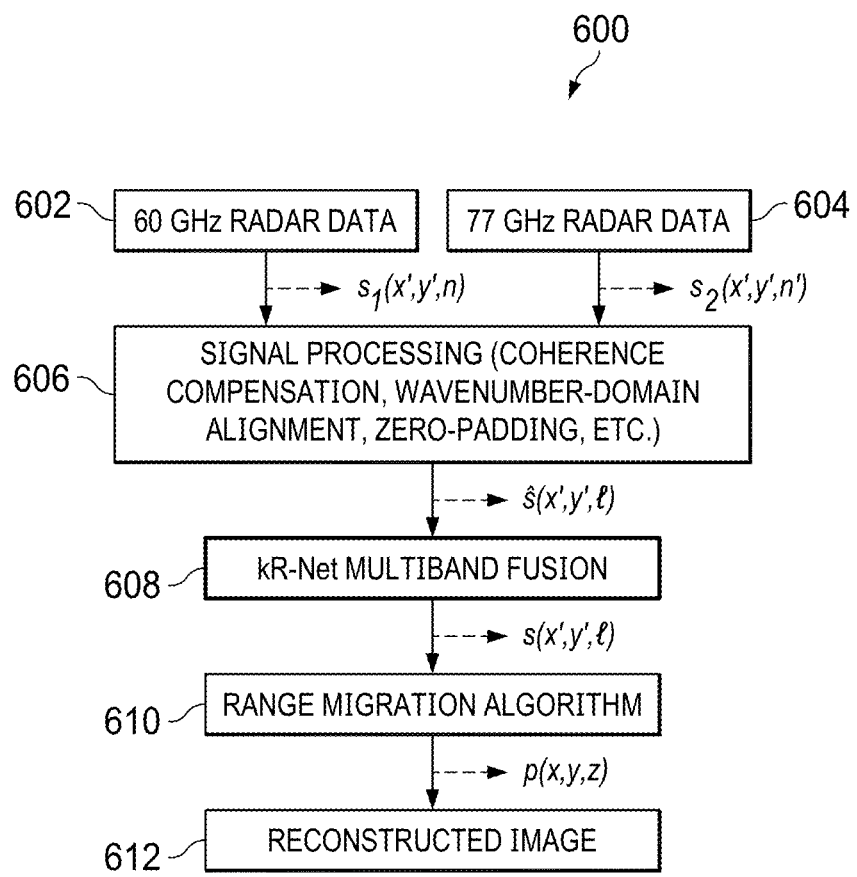
FIG. 6 depicts the algorithm of a multiband signal fusion pipeline in accordance with an illustrative embodiment.

FIG. 6 depicts the algorithm of a multiband signal fusion pipeline in accordance with an illustrative embodiment. After the data are collected from both radars (steps 602, 604), a preprocessing step 606 may be used to ensure signal coherence and align the data in the k-domain. The algorithm 600 is valid for both collocated and non-collocated antennas. The data from both subbands are fused using the kR-Net 300 shown in FIG. 3 (step 608). Applying kR-Net to the multiband signal is advantageous compared with the classical signal processing algorithms because kR-Net is highly parallelizable and can efficiently perform signal fusion for many samples. The range migration algorithm (RMA) can be applied after the signal fusion step to produce a high-resolution 3-D image (step 610). After multiband fusion is performed using kR-Net, the SAR image is reconstructed from the fused data to produce a high-fidelity reconstruction of both low and high-bandwidth targets (step 612).

Compared to conventional signal processing-based algorithms for multiband fusion, the kR-Net algorithm 600 yields superior imaging performance and demonstrates robustness for the realistic case of high-bandwidth, intricate targets.

Figure 7:
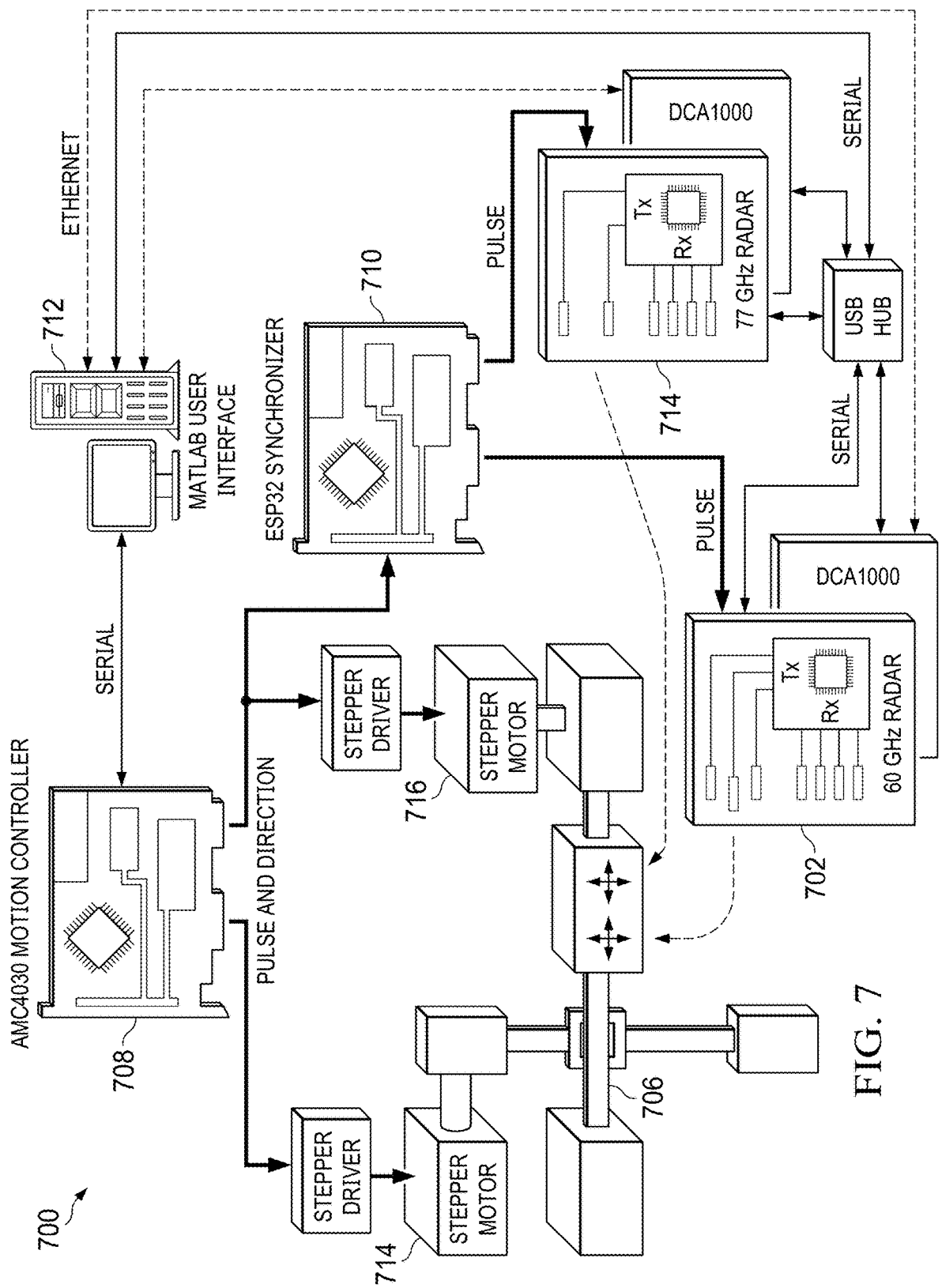
FIG. 7 depicts a diagram of multiband imaging system in accordance with an illustrative embodiment.

FIG. 7 depicts a diagram of multiband imaging system in accordance with an illustrative embodiment. Multiband imaging system 700 can be implemented using commercially available mmWave radars. Whereas prior research on near-field multiband radar imaging has employed sophisticated laboratory equipment, which is not suitable for many practical applications, multiband imaging system 700 provides a highly integrated system that employs commercially available equipment for multiband nearfield SAR. Multiband imaging system 700 uses two mmWave radars operating at distinct subbands and introduces a synchronization strategy to achieve efficient data collection. In the present example, multiband imaging system 700 comprises a 60 GHz radar 702, 77 GHz radar 704, two-axis mechanical scanner 706, motion controller 708, synchronization module 710, and a host computer system 712. Algorithm 600 and kR-net 300 can be implemented in computer system 712 in multiband imaging system 700.

In the example implementation, the Texas Instruments (TI) IWR6843ISK and IWR1642BOOST can be used as the single chip 60 GHz radar 702 and 77 GHz radar 704, respectively. Both radars have an operating bandwidth of B=4 GHz; hence, the subbands span 60-64 GHz and 77-81 GHz. Additionally, the LFM radars can be configured with the parameters detailed above. The data are captured in real-time by the TI DCA1000 evaluation module for each radar 702, 704 and streamed to the host computer system 712 over Ethernet.

Both radars 702, 704 are mounted onto a belt-driven two-axis mechanical scanner 706 such that the lowest Rx antennas on each radar are aligned, and the radars are separated horizontally by a distance of $\Delta_x$.

The two-axis mechanical scanner 706 is driven by stepper motors 714, 716 that receive pulses from the motion controller 708. Multiband imaging system 700 employs a novel multi-radar synchronizer 710 for precise positioning of both radars while operating at high scanning speeds. The entire system is controlled via a MATLAB interface on the host computer system 712.

The superiority of the proposed kR-Net has been demonstrated through numerical simulations and empirical experiments. The matrix Fourier transform (MFT) algorithm and the matrix pencil approach (MPA) are adopted as comparison baselines. After kR-Net is trained using the procedure detailed above, we conducted experiments on both synthetic and empirical multiband data to validate the performance of kR-Net compared with traditional signal processing approaches. We consider a dual-band system with the radar signaling parameters discussed previously.

Figure 8A:
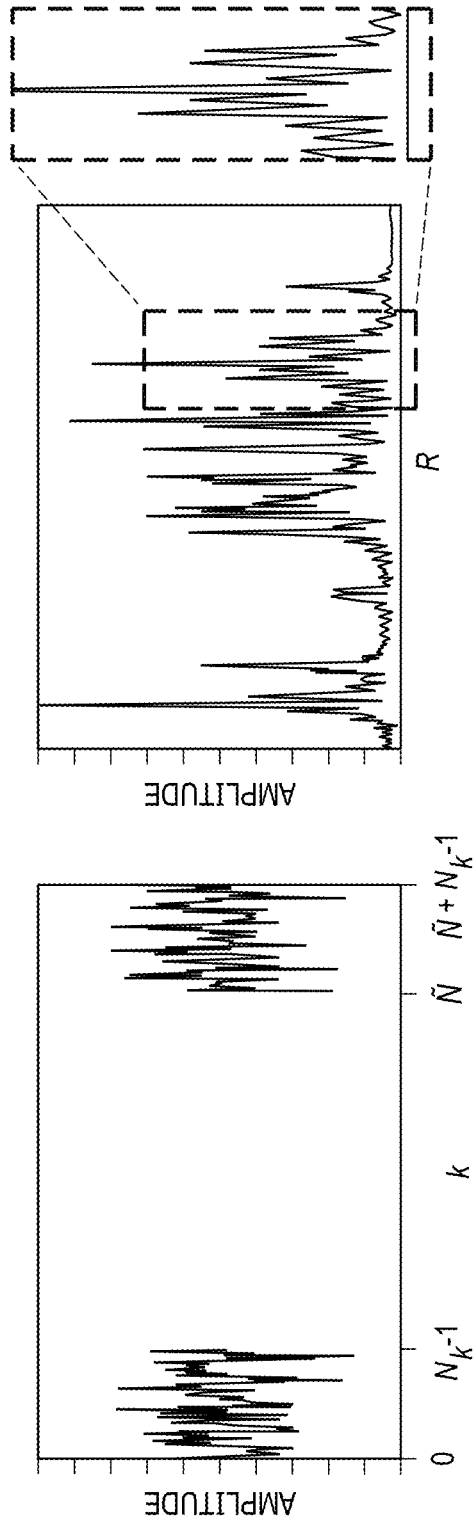
FIG. 8A illustrates multiband signal fusion performance using MFT.
Figure 8B:
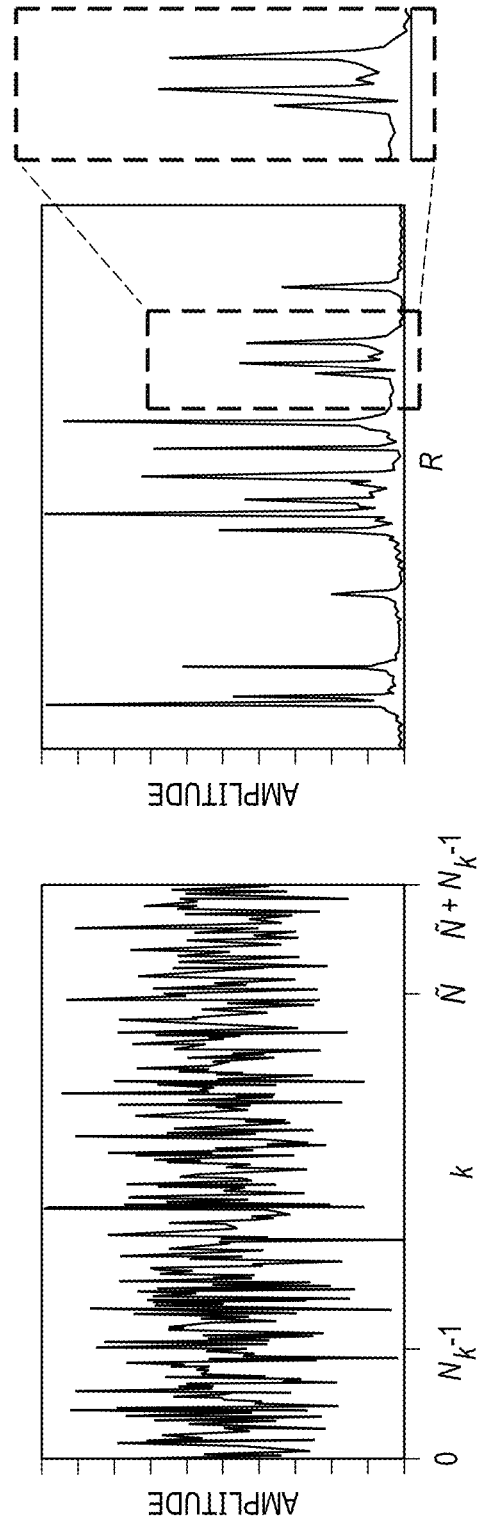
FIG. 8B illustrates multiband signal fusion performance using MPA.

FIGS. 8A-8D illustrate the comparison of multi-band signal fusion performance against the ideal full-band scenario. The k-domain signals and R-domain spectra for the MFT, MPA, and kR-Net are shown in FIGS. 8A-8C, respectively, and compared against the corresponding ideal full-band signal shown in FIG. 8D. Each subband is corrupted with AWGN at an SNR of 20 dB. The MPA interpolates between the two subbands to recover a signal of length N. However, the resulting wideband signal deviates from the ideal signal owing to the assumptions in the MPA. Although it outperforms the MFT, the MPA is unable to recover every peak in the R-domain. As can be seen the figures, kR-Net yields the most accurate reconstruction of the full-band signal.

Using the multiband imaging system shown in FIG. 7, we acquire radar data of several objects at the two aforementioned subbands and compare the imaging results of the various multiband fusion algorithms.

Figure 9:
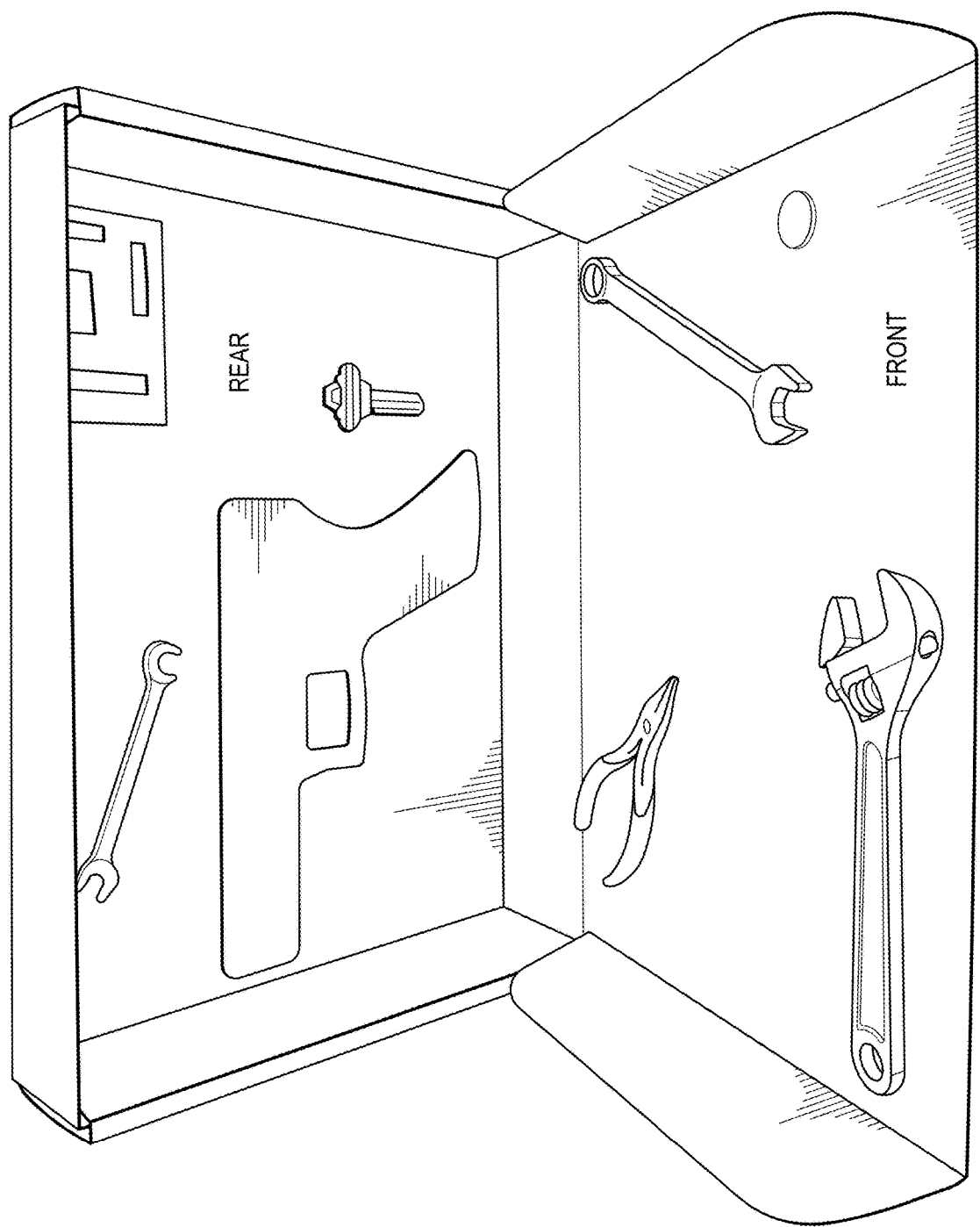
FIG. 9 illustrates hidden objects inside a carboard box for use in image reconstruction according to the illustrative embodiments.

We consider a hidden object scenario with several items inside a cardboard box, as shown in FIG. 9. The box is positioned such that the front of the box is located 200 mm from the radar boresight and is parallel to the synthetic array. The items attached to the front of the box are separated from those in the rear by 5 cm and the box is illuminated by an array with dimensions of 0.25 m×0.125 m. For a closer spacing along the z-direction, the imaging results are expected to be further degraded.

FIGS. 10A-10E illustrate reconstruction of hidden items in the box shown in FIG. 9 using to different methods. FIGS. 10A-10E show the reconstructed 3-D images and slices at z=200 mm and z=250 mm, corresponding to the front and rear of the box, respectively. For accurate high-resolution imaging, the slice at z=200 mm should contain only the objects at the front of the box and the slice at z=250 mm should contain only the objects at the rear of the box.

Figure 10A:
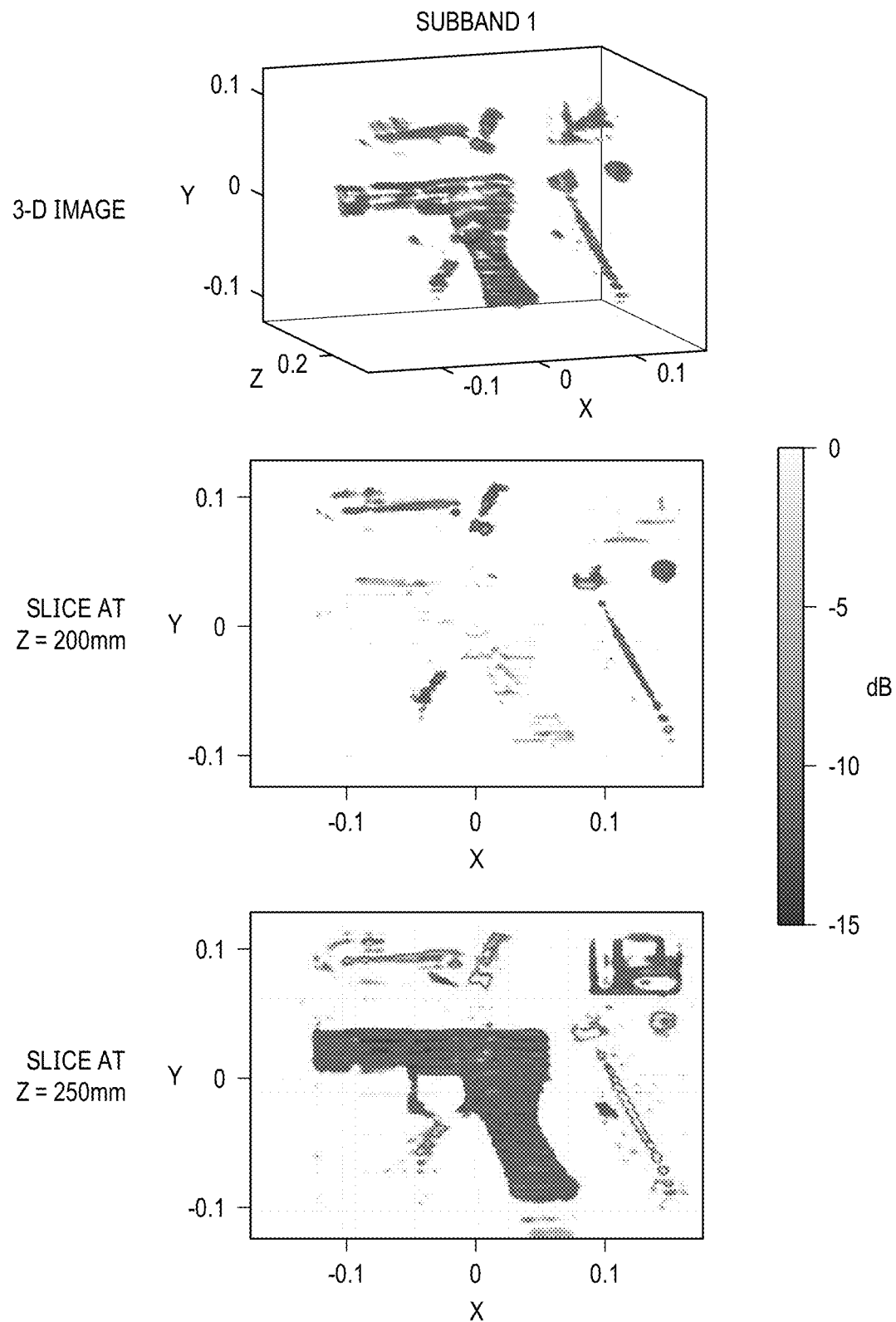
FIG. 10A illustrate reconstruction of hidden items in the box shown in FIG. 9 using subband 60-64 GHz.
Figure 10B:
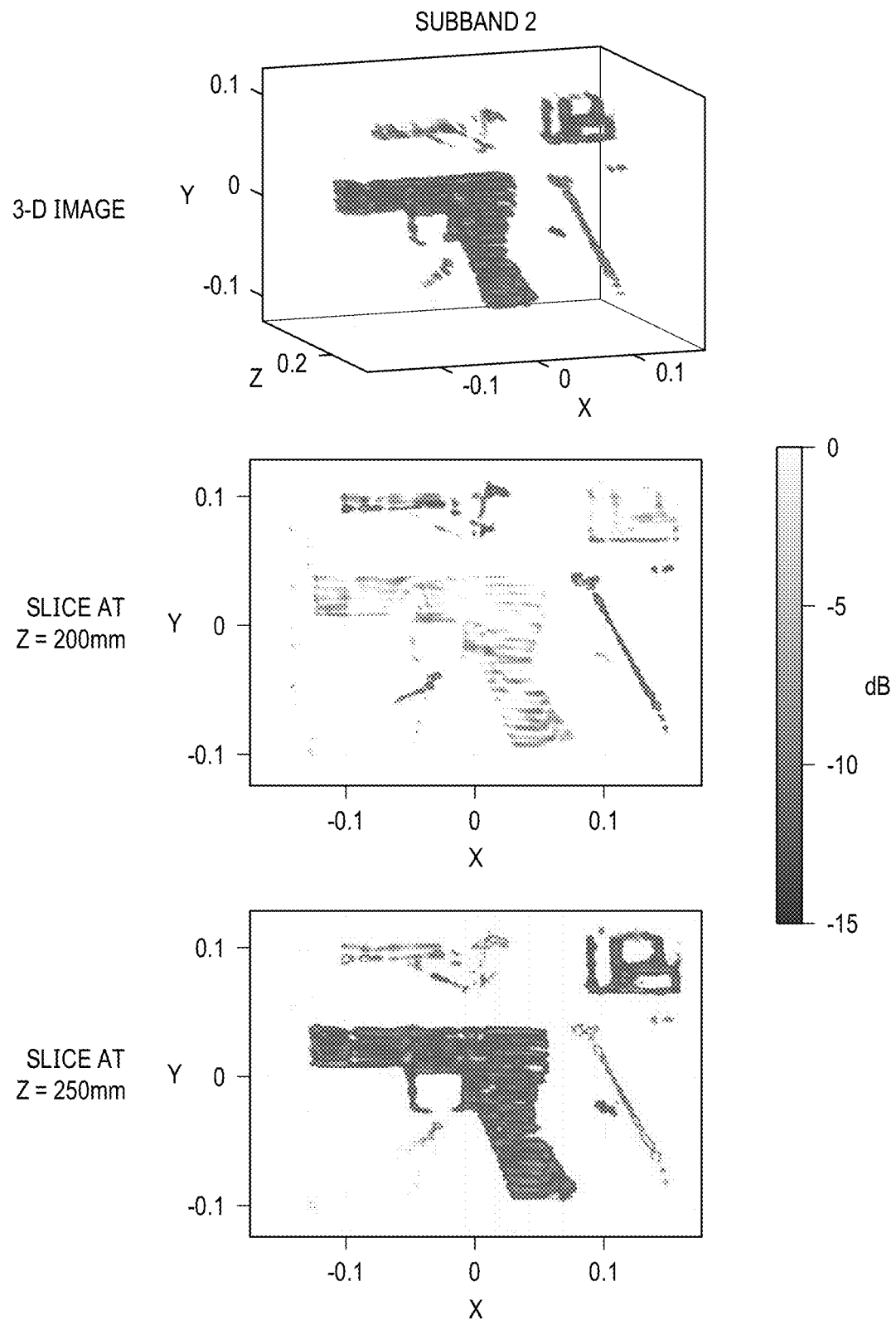
FIG. 10B illustrate reconstruction of hidden items in the box shown in FIG. 9 using subband 77-81 GHz.

For the two subbands with bandwidths of 4 GHz, the recovered images are spread across the z-direction, and both slices shown are contaminated by objects from the front and rear, as shown in FIGS. 10A (60-64 GHz) and 10B (77-81 GHz). The small wrench and key, both located at the rear of the box, suffer from weaker reflections and occlusion and are not well resolved by the algorithms tested. A cylindrical SAR approach or image enhancement algorithm may improve image quality in the case of occlusion.

Figure 10C:
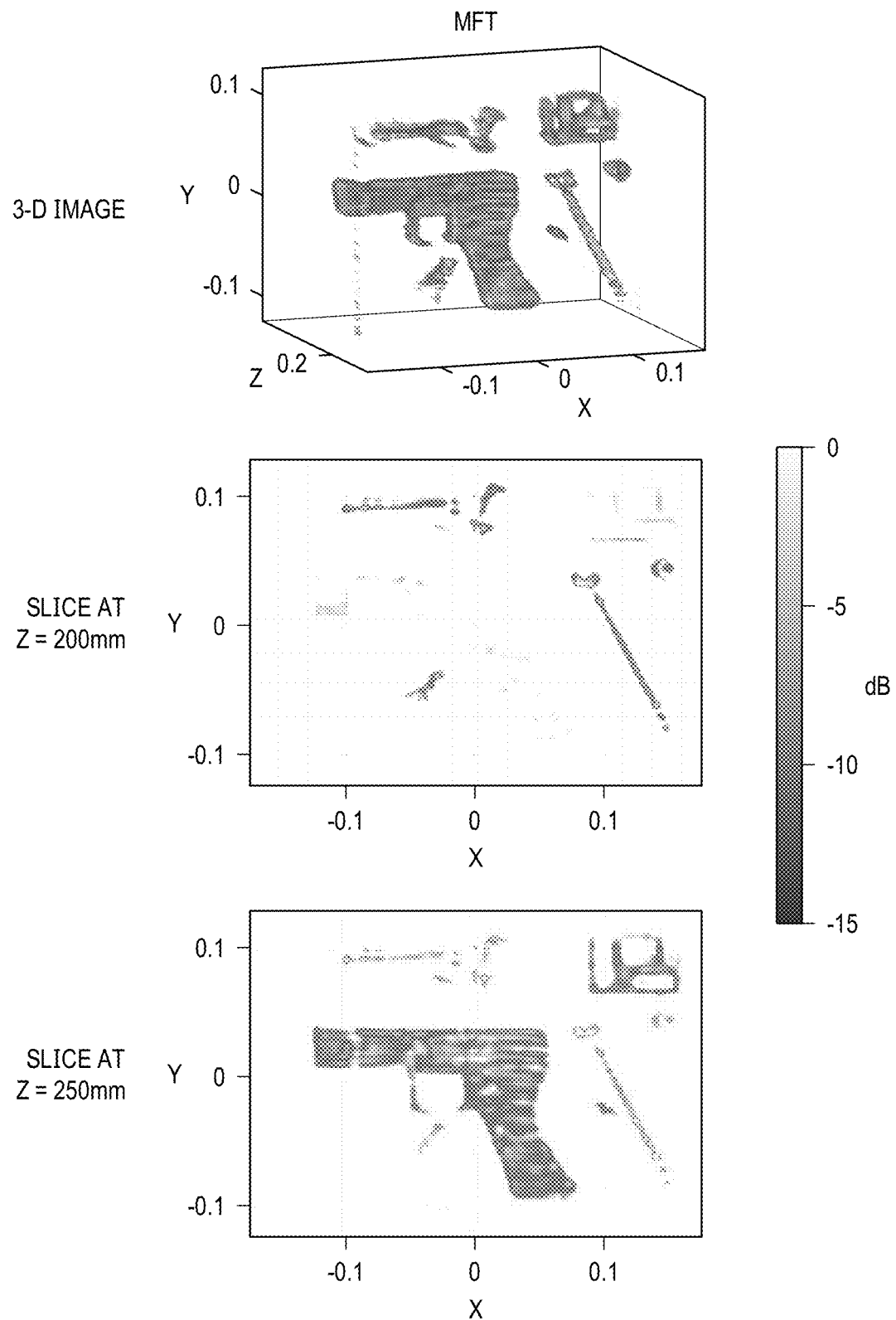
FIG. 10C illustrate reconstruction of hidden items in the box shown in FIG. 9 using MFT.
Figure 10D:
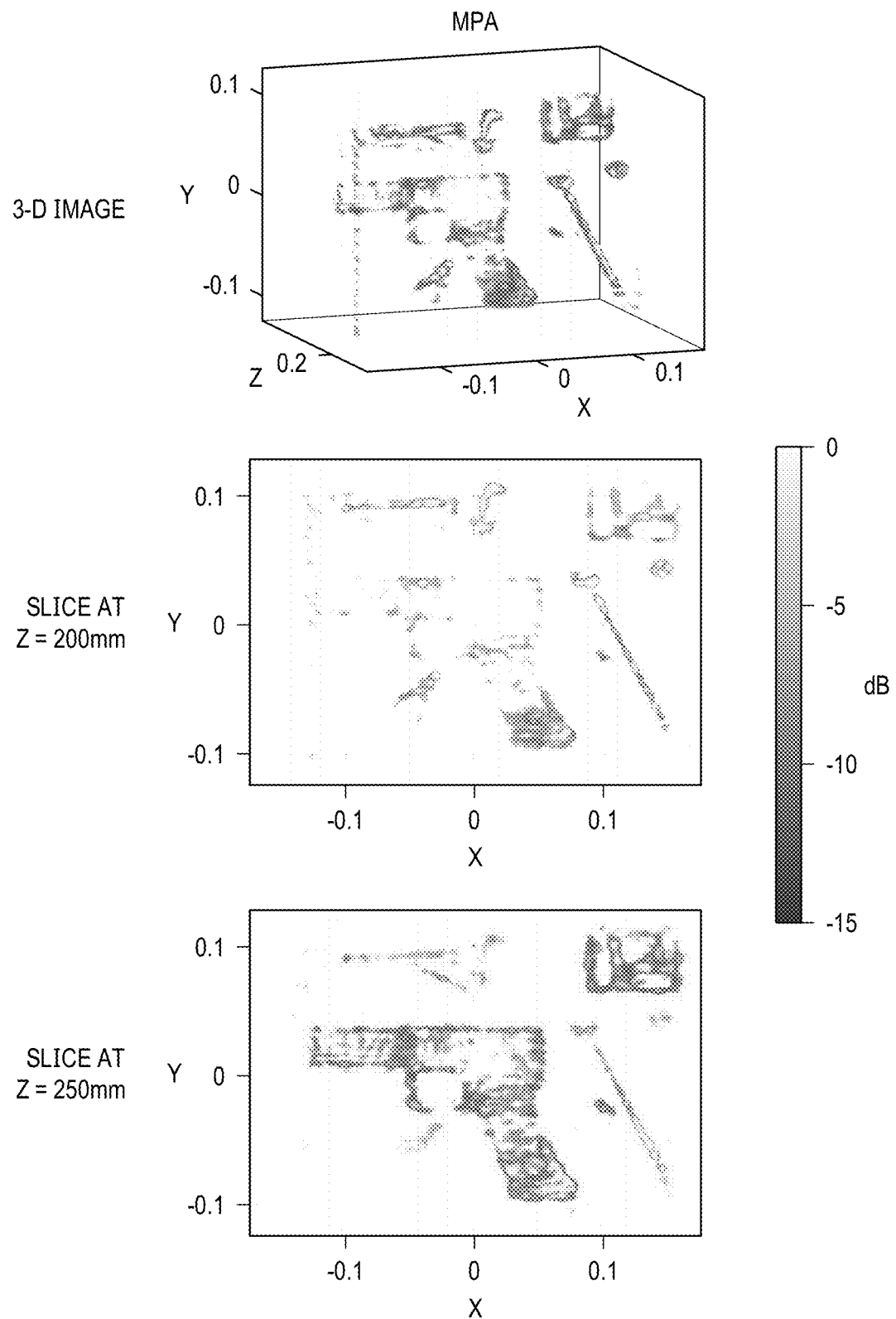
FIG. 10D illustrate reconstruction of hidden items in the box shown in FIG. 9 using MPA.

The image recovered using the MFT, shown in FIG. 10C, exhibits the expected behavior as sidelobes along the range direction cause ghosting, which results in the objects being visible in both range slices. Similarly, the MPA is able to reduce the sidelobes moderately compared to the MFT, as shown in FIG. 10D. However, as expected from prior experiments and inherent limitations of the MPA, the sidelobes are not mitigated, and some features of the objects are lost.

Figure 10E:
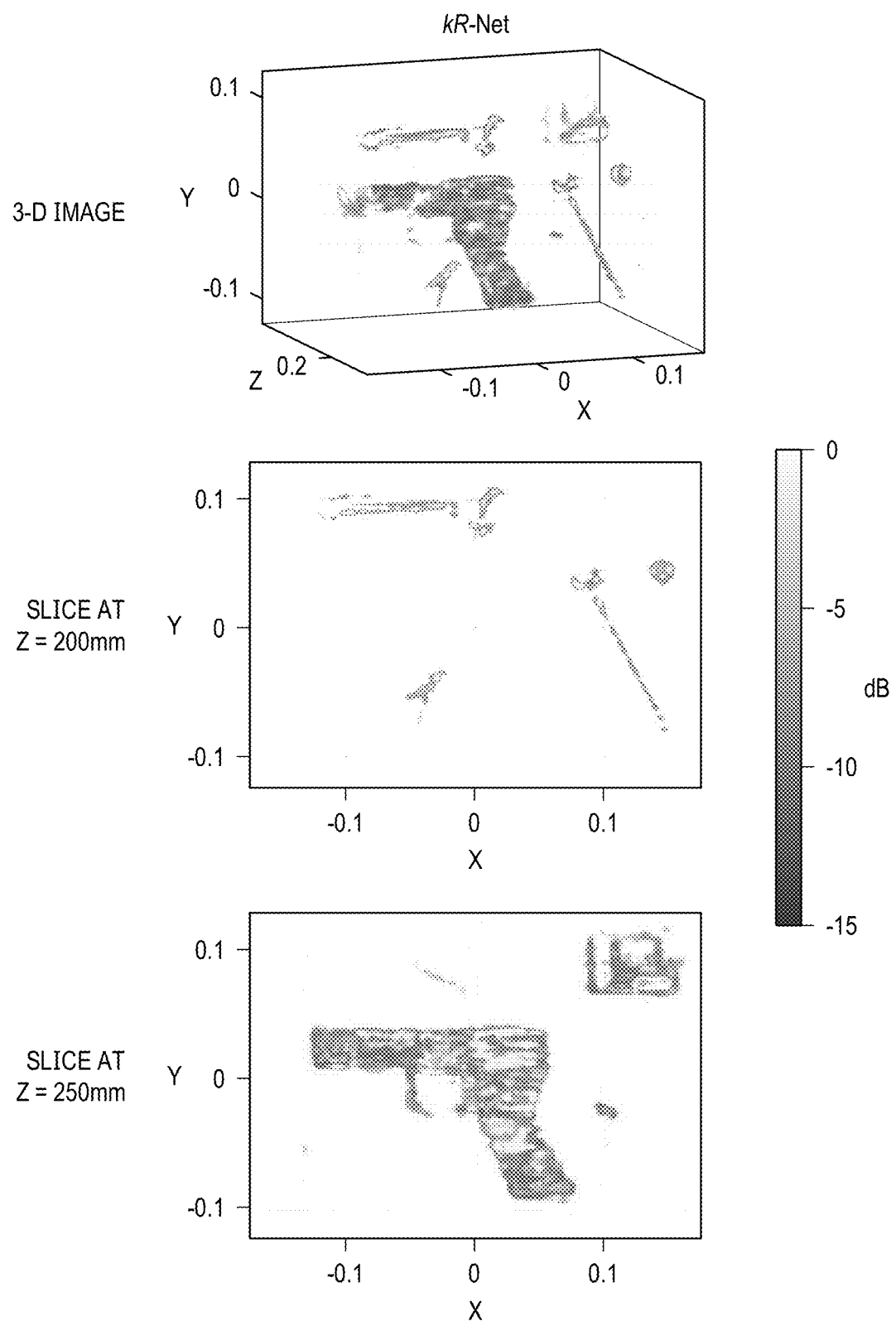
FIG. 10E illustrate reconstruction of hidden items in the box shown in FIG. 9 using kR-net.

The image recovered using kR-Net is shown in FIG. 10E and demonstrates improved performance in two key respects. First, the kR-Net image retains the high-fidelity features of the target that are necessary for a host of applications, including image segmentation and object classification. The image quality of the wrenches is particularly notable, as the jaw of each wrench is more clearly visible compared to the images recovered from the other approaches. Secondly, the ghosting along the z direction is significantly reduced with kR-net, and the objects at the front side of the box are visible only in the z=200 mm slice. Likewise, the objects at the rear side of the box are only visible in the z=250 mm slice. Without the contamination observed using the MFT or MPA, the objects can be more easily localized and classified with kR-net, enabling super-resolution for a host of imaging applications. The proposed hybrid, dual-domain algorithm yields high-resolution, high-fidelity images without feature loss and demonstrates improved performance over the existing techniques.

Through numerical simulation and empirical analysis, the algorithm of the illustrative embodiments demonstrates superior performance to the MFT and MPA in terms of efficiency and image quality. The proposed kR-Net offers improved robustness for low and high-bandwidth target scenarios in addition to low SNR conditions. For the practical imaging of complex, sophisticated targets, kR-Net achieves spatial super-resolution by improved multiband signal fusion without compromising the intricate features of the target. Hence, kR-Net is better suited for high-resolution multiband imaging applications than MFT and MPA.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computing-implemented method of multiband radar fusion, the method comprising:
    collecting first radar data from a first radar having a first frequency;
    collecting second radar data from a second radar having a second frequency different from the first frequency;
    fusing, by a neural network, the first and second radar data, wherein the neural network alternates between operating in the wavenumber-domain and the spatial-domain of the first and second radar data, wherein the neural network comprises:
        a first complex-valued convolution layer;
        four residual blocks following the first complex-valued convolution layer;
        domain transformation blocks interleaved between the four residual blocks;
        a pass-through connection in the wavenumber-domain from the first complex-valued convolution layer to after the fourth residual blocks;
        a fifth residual block following the pass-through connection; and
        a second complex-valued convolution layer; and
    reconstructing a synthetic aperture radar image from the fused first and second radar data according to Fourier-based algorithm.

2. The method of claim 1, wherein the reconstructed synthetic aperture radar image is a 3-D image.

3. The method of claim 1, wherein each residual block comprises:
    complex-valued residual blocks; and
    a single complex-valued convolution layer.

4. The method of claim 3, wherein each complex-valued residual block comprises two complex-valued convolution layers separated by an activation function.

5. The method of claim 4, wherein the activation function comprises a complex parametric rectified linear unit.

6. The method of claim 1, wherein input into the neural network comprises normalized spatial-domain data, and output from the neural network comprises wavenumber-domain data.

7. The method of claim 1, further comprising preprocessing the first radar data and second radar data to ensure signal coherence and alignment in the wavenumber-domain.

8. The method of claim 1, further comprising applying the range migration algorithm after fusion of the first and second radar data by the neural network.

9. A neural network for fusing radar data, comprising:
a first complex-valued convolution layer;
four residual blocks following the first complex-valued convolution layer;
domain transformation blocks interleaved between the four residual blocks;
a pass-through connection in the wavenumber-domain from the first complex-valued convolution layer to after the fourth residual blocks;
a fifth residual block following the pass-through connection; and
a second complex-valued convolution layer.

10. The neural network of claim 9, wherein each residual block comprises:
complex-valued residual blocks; and
a single complex-valued convolution layer.

11. The neural network of claim 10, wherein each complex-valued residual block comprises two complex-valued convolution layers separated by activation function.

12. The neural network of claim 11, wherein the activation function comprises a complex parametric rectified linear unit.

13. The neural network of claim 9, wherein input into the hybrid, dual-domain CV-CNN comprises normalized spatial-domain data, and output from the hybrid, dual-domain CV-CNN comprises wavenumber-domain data.

14. A multiband imaging system, comprising:
two-axis mechanical scanner;
a first radar having a first frequency mounted to the two-axis mechanical scanner;
a second radar having a second frequency different from the first frequency mounted to the two-axis mechanical scanner; and
a computer system connected to the first radar, second radar, and two-axis controller, wherein the computer system is configured to:
collect first radar data from the first radar;
collect second radar data from a second radar;
fuse, by a neural network, the first and second radar data, wherein the neural network alternates between operating in the wavenumber-domain and the spatial-domain of the first and second radar data, wherein the neural network comprises:
a first complex-valued convolution layer;
four residual blocks following the first complex-valued convolution layer;
domain transformation blocks interleaved between the four residual blocks;
a pass-through connection in the wavenumber-domain from the first complex-valued convolution layer to after the fourth residual blocks;
a fifth residual block following the pass-through connection; and
a second complex-valued convolution layer; and
reconstruct a synthetic aperture radar image from the fused first and second radar data according to Fourier-based algorithm.

15. The multiband imaging system of claim 14, wherein each residual block comprises:
complex-valued residual blocks; and
a single complex-valued convolution layer.

16. The multiband imaging system of claim 15, wherein each complex-valued residual block comprises two complex-valued convolution layers separated by activation function.

17. The multiband imaging system of claim 16, wherein the activation function comprises a complex parametric rectified linear unit.

18. The multiband imaging system of claim 14, wherein input into the neural network comprises normalized spatial-domain data, and output from the neural network comprises wavenumber-domain data.

* * * * *